Oct. 9, 1951 E. O. KEIZER ET AL 2,571,041

HETERODYNE DETECTOR CIRCUIT

Filed June 28, 1946

INVENTORS
EUGENE O. KEIZER
BY & VERNON D. LANDON
H. S. Grover
ATTORNEY

Patented Oct. 9, 1951 2,571,041

UNITED STATES PATENT OFFICE 2,571,041

HETERODYNE DETECTOR CIRCUIT

Eugene O. Keizer and Vernon D. Landon, Princeton, N. J., assignors to Radio Corporation of America, a corporation of Delaware Application June 28, 1946, Serial No. 679,933

7 Claims. (Cl. 250—20)

The present invention relates to a heterodyne detector circuit and more particularly to a detector circuit which utilizes a diode rectifier to effect the mixing between the signal and oscillator frequencies.

A serious disadvantage in certain types of heterodyne detectors is the appearance in the input circuit of the heterodyning voltage and consequently the radiation of this voltage from the input circuit causing interference and other disturbances.

It is therefore one of the main objects of this invention to provide a heterodyne system in which the heterodyning voltage has practically no effect on the input to the detector.

Another object of the invention is to couple the local or heterodyne oscillator to the detector in such a way that at a common point of connection to the detector of the signal and oscillator circuits the voltage due to the oscillator is zero so that energy from the oscillator will be precluded from the input and other circuits which may precede the detector.

Figure 1:
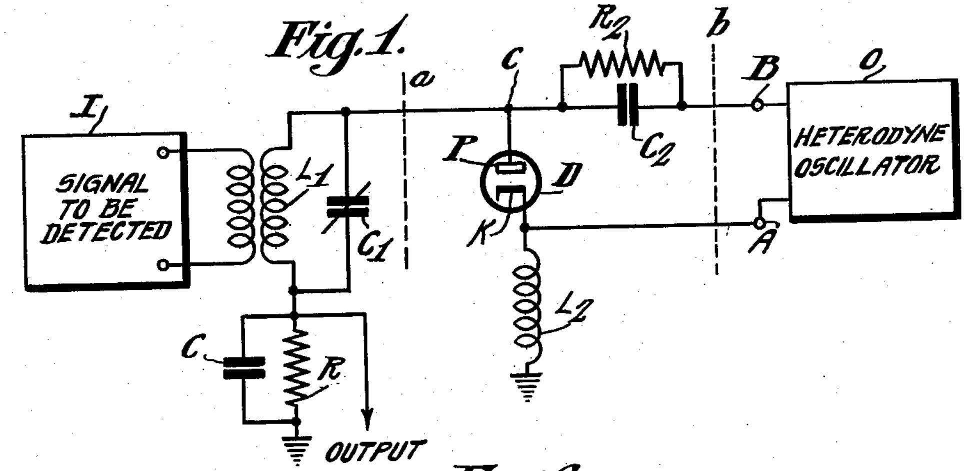
Figures 1A, 2:
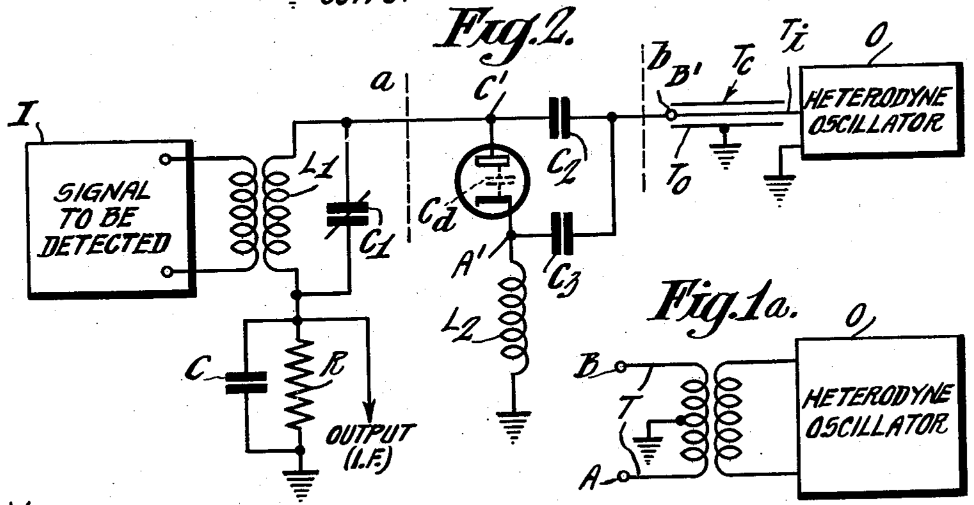
Figure 3:
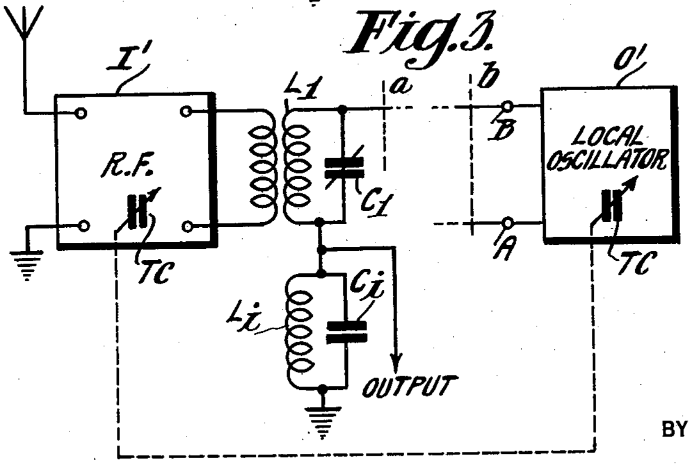

Other objects and advantages of the invention will be best understood by a consideration of the following description taken together with the accompanying drawing, wherein:

Fig. 1 discloses a heterodyne detector circuit according to one form of the present invention;

Fig. 1*a* shows a modification of a portion of the circuit shown in Fig. 1;

Fig. 2 is a further embodiment of a detector circuit according to the invention; and Fig. 3 shows the application of the invention to a superheterodyne receiver.

Referring to Fig. 1 there is shown at D a diode rectifier tube to the plate or anode P of which there is connected at point C an inductance $L_1$ shunted by a condenser $C_1$, said inductance and condenser constituting a parallel-tuned circuit which resonates at the signal frequency to be detected. An input circuit I, carrying the signal to be detected, is coupled to the inductance $L_1$, and connected between the inductance $L_1$ and ground is a load resistor R shunted by a condenser C. An inductance $L_2$ is connected between the cathode K of the diode and ground, and connected to anode P at point C is a condenser $C_2$ shunted by a resistance $R_2$. The heterodyning voltage from local oscillator O is applied between the points A and B, A being connected to the common terminal between cathode K and inductance $L_2$, and point B being connected to point C through the resistor-capacitor network $R_2$—$C_2$.

In the circuit of Fig. 1, energy from the heterodyning oscillator is prevented from reaching the circuits preceding point C. This is accomplished by feeding out of phase voltages at points A and B. Proper values of $R_2$ and $C_2$ will result in zero voltage at point C, in which case no energy from the heterodyne oscillator will flow into $L_1$—$C_1$ or preceding circuits. $C_2$ should be approximately equal in capacity to the diode plate-cathode capacity, and $R_2$ approximately equal to the effective resistance of the diode to the heterodyne oscillator signal.

The principle may be applied to triodes and other types of detectors as well as diodes. At frequencies where the capacitive coupling across the detector is considerably greater than the resistive coupling, $R_2$ may be omitted without much adverse effect on the balance. For example, in one application to which we have put this circuit we have used a 6H6 diode at 120 megacycles. The capacitive coupling across the diode from plate to cathode is about fifty times as great as the resistive coupling (400 ohms to 20,000 ohms). Proper value of $C_2$ alone will balance out this capacity coupling with corresponding reduction of oscillator energy fed to inductance $L_1$.

Although in Fig. 1 the impedance between point A (or cathode) and ground is shown to be an inductance, it could be a resistor, or else a parallel resonant circuit tuned to the local oscillator frequency. If the impedance to ground from point A is too low it will unbalance the input from the heterodyne oscillator. This unbalancing can be reduced by making the impedance from A to ground high at the oscillator frequency, or by connecting from point B to ground an impedance similar to that connected from A to ground.

One method of obtaining out of phase voltages for points A and B is to use a balanced line T from the heterodyne oscillator as shown in Fig. 1*a*. Another method is illustrated in Fig. 2, where the inner conductor $T_i$ of a concentric line $T_c$ from the heterodyne oscillator O is connected to point B′ and the outer conductor or shield $T_o$ is grounded. In this embodiment coupling capacitor $C_2$ is not shunted by a resistance as in Fig. 1, but a capacitor $C_3$ is connected between the points A′ and B′. $C_2$ in this figure is also approximately equal in capacity to the diode plate-cathode capacity, which might be 5 micromicrofarads. The value of $C_3$ depends upon the value of coil $L_2$, a value of 18 micromicrofarads being a typical value. The effective reactance from point A′ to ground is inductive, being determined principally by $L_2$. The effective reactance from point B′ to point A′ is made capacitive and larger than the inductive reactance of point A′ to ground. Thus, the voltage from point A′ to ground will be approximately 180° out of phase with the voltage from point B′ to ground. If the ratio of $C_2$ to the diode plate-cathode capacity $C_d$ is inverse to that of the voltage at B′ to that at A′, the voltage at C′ will be a minimum. In other words, the impedance from A′ to ground is required to be inductive. Furthermore, its inductive reactance must be less than the capacitive reactance from B′ to A′. The circuit from B′ to A′ to ground represents a series capacitor and inductance whose resonant frequency is above operating frequency, perhaps 1½ times. Thus, the net impedance from B′ to ground is capacitive. The impedance from A′ to ground is inductive. A current flowing from B′ to A′ to ground produces a voltage at A′ which is out of phase by nearly 180° from the applied voltage from B′ to ground. The point C′ receives potential from both point A′ and B′ in general. However, if the potential received from B′ through $C_2$ is equal in magnitude to that received from A′ through the diode capacity the net potential of heterodyne oscillator frequency at A′ will be zero, due to the out-of-phase relationship.

An important result from the use of the circuits of Figs. 1 and 2 is the reduction of microphonics which are otherwise generated in the plate circuit of the tube preceding the detector.

The heterodyne detector circuit of the present invention has application also as a mixer or first detector circuit in a superheterodyne receiver so that radiation from the local oscillator may be reduced to a minimum. This is shown in Fig. 3 where the detector input circuit $L_1$—$C_1$ has coupled to it a radio frequency amplifier I′. The latter and the local oscillator O′ are provided each with a tuning means, as for example, a variable condenser TC, both of which are actuated conjointly to tune the receiver over its entire operating range. The omitted portion of the circuit in Fig. 3 between the dash lines *a* and *b* may be the correspondingly designated portion between the dash lines *a* and *b* in either Fig. 1 or Fig. 2. The intermediate frequency (I. F.) resulting from the mixing action of the diode may be derived from a load resistor as shown in Figs. 1 and 2 or else from a parallel resonant circuit $L_1$—$C_1$ as shown in Fig. 3 which is tuned to the I. F. frequency. The mixer output is then fed in the usual way to an I. F. amplifier, a second detector, an audio stage, and finally to a loudspeaker, which elements are not shown since they are well-known in the art.

While we have shown and described several embodiments of our invention, it will be understood that various modifications and changes will occur to those skilled in the art without departing from the spirit and scope of this invention.

What we claim is:

1. In a heterodyne detector circuit, a diode rectifier, having a cathode and an anode, an inductance element connected between the cathode of the rectifier and ground, a second inductance element and a load resistor serially connected between the anode of the rectifier and ground, a source of signal oscillations coupled to said second inductance element, a local source of oscillations, a conductive connection including an impedance element connected for impressing the local oscillations on the anode and on the cathode of said rectifier out-of-phase with respect to a point of fixed potential, an impedance network having an impedance which substantially equals that of said rectifier and provided between said local source and the anode and a connection from the load resistor for deriving the beat frequency resulting from mixing of the local oscillations with the signal oscillations.

2. In a heterodyne detector circuit, a diode rectifier, an inductance element connected between the cathode of the rectifier and ground, a second inductance element and a load impedance element serially connected between the anode of the rectifier and ground, a source of signal oscillations coupled to said second inductance element, a local source of oscillations provided with a pair of terminals from which out-of-phase voltages are derived, an impedance means connected between one of said pair of terminals and the anode of said diode, circuit means connected between the other of said pair of terminals and the cathode of said diode, and a connection from the load impedance element for deriving the beat frequency resulting from mixing of the local oscillations with the signal oscillations.

3. A heterodyne detector circuit as defined in claim 2 wherein said impedance means includes a condenser shunted by a resistor.

4. A heterodyne detector circuit as defined in claim 2 wherein one terminal of the heterodyne oscillator is grounded and the other terminal is connected to the anode through a condenser and to the cathode through a second condenser.

5. In a heterodyne detector circuit, a source of signal oscillations, a local source of an unmodulated wave, a rectifier having a first and a second electrode, said source of signal oscillations being coupled to said first electrode, circuit means connected between said local source and said rectifier for impressing said wave on both said electrodes substantially 180 degrees out of phase with respect to a point of fixed potential, and a network including a condenser having an impedance substantially equal to the impedance of said rectifier and being connected between said local source and said first electrode so that the voltage at said first electrode due to said wave is substantially zero.

6. In a heterodyne detector circuit, a source of signal oscillations, a local source of an unmodulated wave, a diode rectifier having a cathode and an anode, said source of signal oscillations being coupled to said anode, a cathode impedance element connected to said cathode, a load impedance element in circuit with said cathode impedance element and with said source of signal oscillations, circuit means between said local source and said rectifier for impressing said wave on said cathode and on said anode substantially 180 degrees out of phase with respect to a point of fixed potential, and a network including a condenser having an impedance substantially equal to the impedance of said rectifier and being connected between said local source and said anode so that the voltage at said anode due to said wave is substantially zero.

7. In a heterodyne detector circuit, a source of signal oscillations, a local source of unmodulated wave having two output terminals from which voltages are derived which are out of phase with respect to a point of fixed potential, a diode rectifier having a cathode and an anode, said source of signal oscillations being coupled to said anode, a coil connected to said cathode, a load impedance element in circuit with said coil and with said source of signal oscillations, a first condenser connected between one of said terminals and said anode, a second condenser connected between said one of said terminals and said cathode, said first condenser having a reactance substantially equal to the reactance of said rectifier so that the voltage at said anode due to said waves is substantially zero.

EUGENE O. KEIZER.
VERNON D. LANDON.

REFERENCES CITED

The following references are of record in the file of this patent:

UNITED STATES PATENTS

| Number | Name | Date |
|---|---|---|
| 2,141,750 | Herold | Dec. 27, 1938 |
| 2,239,560 | Herold | Apr. 22 1941 |
| 2,253,853 | Haantjes et al. | Aug. 26, 1941 |
| 2,273,640 | Haantjes et al. | Feb. 17, 1942 |
| 2,432,183 | Van Slooten et al. | Dec. 9, 1947 |
| 2,453,078 | Posthumus | Nov. 2, 1948 |

FOREIGN PATENTS

| Number | Country | Date |
|---|---|---|
| 551,774 | Great Britain | Mar. 8, 1943 |
| 552,486 | Great Britain | Apr. 9, 1943 |
| 554,675 | Great Britain | July 14, 1943 |
| 413,724 | Great Britain | July 16, 1934 |